Figure 1:
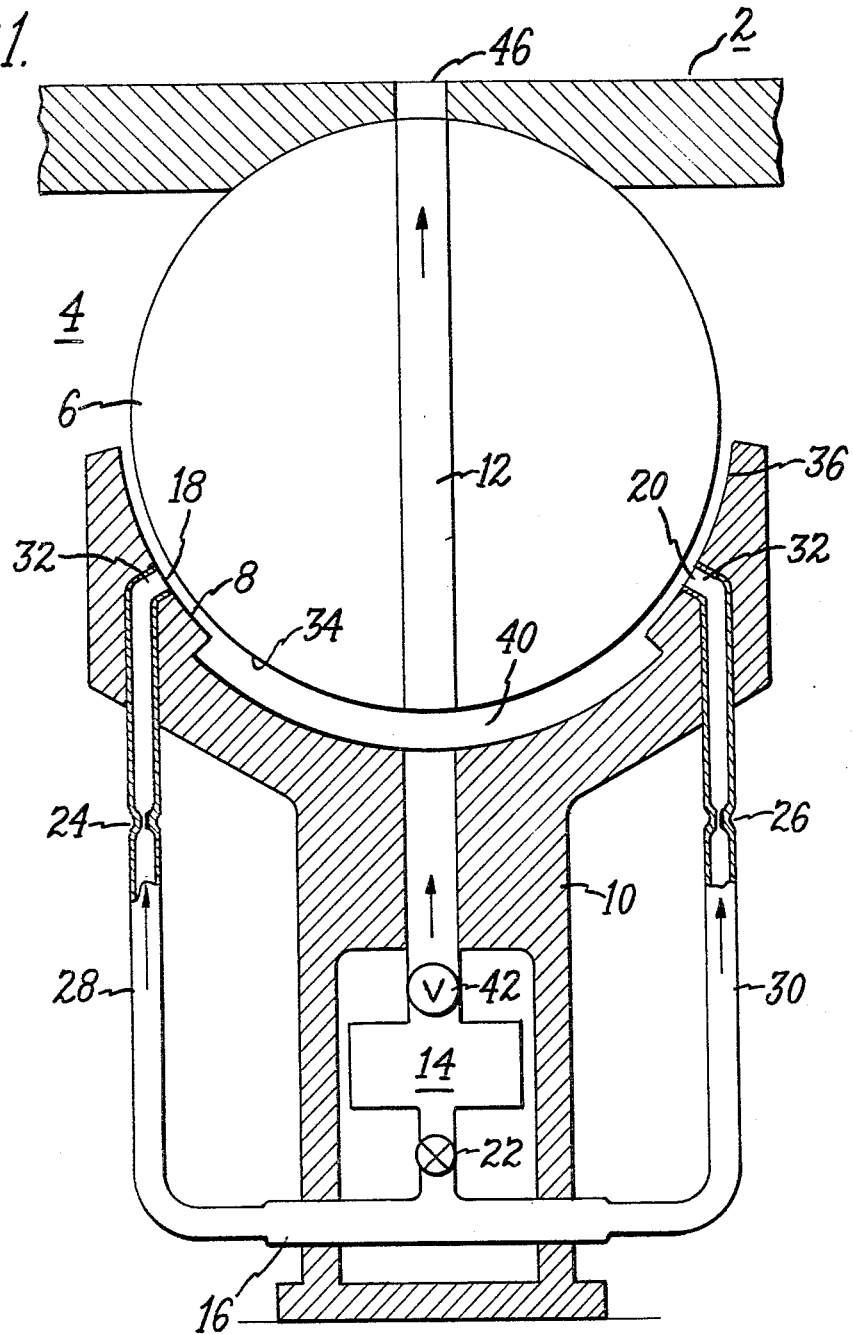

3,380,788
HYDROSTATIC BEARING
Donald F. Wilcock, Pittsfield, Mass., assignor to General Electric Company, a corporation of New York
Filed Dec. 28, 1964, Ser. No. 421,543
9 Claims. (Cl. 308—9)

This invention relates generally to an externally pressurized gas bearing incorporating means for supplying gas to the object being supported on the bearing. More particularly, the present invention pertains to a gas bearing having passage means in the rotor element for delivering a gas stream to other components of the supported object. Specifically, the present bearing construction supplies a stream of gas through the rotor in a manner which does not disrupt an otherwise stabilized mode of bearing operation.

It is often desired to supply pneumatic power to the object being supported on a gas bearing. For example, it has been found advantageous to drive a space table on the bearing by means of externally powered gas jets. The conventional method for supplying the jets utilizes compressed gas containers mounted on the structure, generates the gas by chemical reaction, or carries the gas from a remote supply to the table by means of flexible hoses. This creates a need for hydrostatic and dynamic balance of the added components for efficient operation of the table. The overall construction is simplified if at least a portion of the pressurized gas in the bearing cavity supplies pneumatically powered components such as gas jets, a gyro rotor, and the like. For an object being supported on a spherically shaped bearing to move freely about three axes, it will be advantageous if the gas being removed does not disturb the balance by imparting biasing torques.

To supply a gas stream through the spherically shaped rotor raises other problems. The rotor is displaced from the vertical or bearing axis during ordinary operation to simulate vehicle motion. Continuous gas supply to an external component thereby requires a rotor capable of maintaining flow over a substantial roll angle from the bearing axis. Distribution through the rotor must also not interfere with the bearing gas film supporting the object. Advantageously, all the listed improvements can be carried out from a single gas supply associated with the bearing construction.

It is an important object of the invention, therefore, to provide a gas bearing which supports an object for movement in three axes while simultaneously delivering a gas stream from the bearing rotor which does useful work.

It is another important object of the invention to provide gas bearing support for an object free to move about three axes while furnishing a gas stream from the bearing rotor over substantial displacement angles.

Still another important object to the invention is to provide means for obtaining a gas jet directly from the bearing rotor in a manner which does not disturb stable support of the object.

Figure 2:
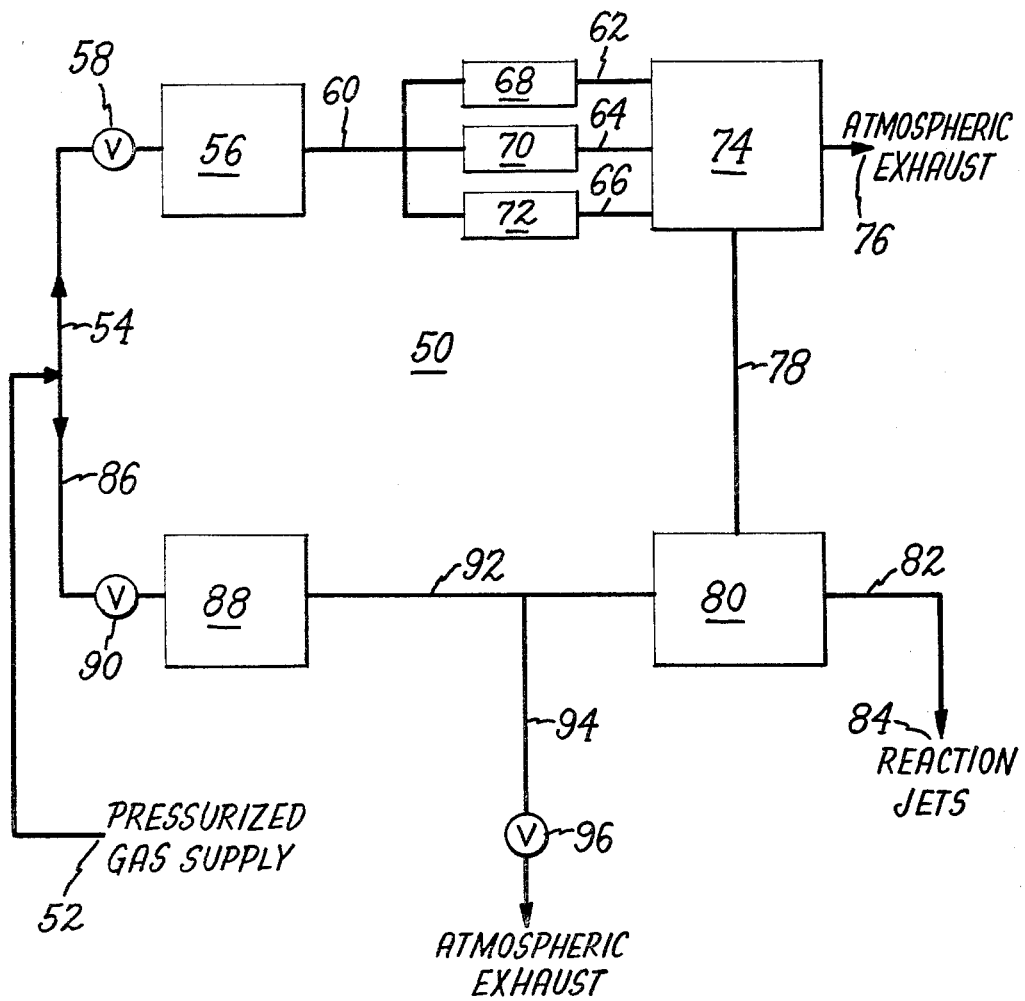

These and other important objects and advantages of the invention will be apparent from the following detailed description taken in connection with the accompanying drawings in which:

FIGURE 1 is a schematic view partially in cross section of the gas bearing of the invention; and FIGURE 2 is a flow diagram of a gas supply system for the bearing construction of the invention.

Briefly, the present gas bearing comprises a spherically shaped rotor, said rotor having a longitudinal passageway extending along the bearing axis, a spherically shaped bearing surface supporting said rotor for movement about three axes, a plenum chamber in the base of said spherically shaped bearing surface in communication with the rotor passageway, circumferential openings disposed uniformly around a latitude circle in said bearing surface, and gas supply means for the circumferential openings and the plenum chamber. By "plenum chamber" as used herein is meant a pocket in the bearing surface having sufficient size to serve as a transfer cavity for the gas being furnished through the bearing rotor. The reservoir capacity and depth of said chamber reduces gas velocities at the rotor interface thereby avoiding shear forces that impart undesirable biasing torques in bearing operation. Stabilized support for the bearing rotor in all three axes is obtained with a circumferential gas flow pattern from the laterally disposed openings in the bearing cavity. This gas flow establishes a load bearing film in the clearance space between the rotor and bearing components. A series of equal size holes equispaced from each other around the bearing cavity is adequate for this function. Alternately, there may be adopted the improved means for bearing stabilization taught in my copending U.S. patent application Ser. No. 402,743 entitled "Hydrostatic Bearing," filed Oct. 9, 1964. Biasing torques about the bearing axis are therein minimized with a circumferential gas flow pattern emerging from the groove having a vector direction passing through the bearing axis. Separation of the groove element into segments of equal length which are equispaced from one another further provides an inherent lateral centering adjustment for the bearing support.

There follows a detailed description of preferred bearing constructions advantageously having the essential features above defined. In each of said preferred embodiments, the bearing axis of the rotor and the spherically shaped bearing surface are aligned in a vertical direction. The circular orientation of openings providing gas flow for the bearing function is in a direction orthogonal to said bearing axis. The plenum chamber communicating with the bearing rotor envelops enough of the rotor surface to provide gas flow to the rotor passageway when rotated through significant angle from the bearing axis. Displacement of the rotor as much as 45 degrees in any direction without interrupting gas flow to the rotor has been achieved. The gas supply in the plenum chamber can serve the added function of supporting as much as 70% of the bearing load. For stabilized operation it will be necessary to maintain a uniform gas film throughout substantially all clearance area in the bearing cavity. Disturbance of the gas film in the clearance region extending between the circumferential openings and the plenum chamber is avoided by maintaining a pressure differential in the individual gas supplies thereto. A higher pressure at the circumferential openings than in the plenum chamber is maintained by control of the gas supply pressure to the individual components. For even closer regulation of the bearing film, it is further contemplated to employ means for regulating gas flow from positions adjacent the circumferential openings.

In FIGURE 1, there is shown in cross section an externally pressurized gas bearing having the improvements above generally described. The particular configuration has a table member 2 which rests solely on bearing assembly 4. Said bearing assembly has spherical rotor element 6 housed in a hemispherical cavity 8 forming the bearing surface of support member 10. A longitudinal passageway 12 extends completely through the otherwise solid rotor element and is aligned along the bearing axis. Support member 10 of the bearing assembly may be another solid member with passageways for transport of the gas from a supply source to the bearing cavity. This can be achieved in conventional fashion utilizing a single gas supply 14 connected separately to the plenum chamber and circumferential openings in the bearing cavity.

In this manner it is possible to achieve a fixed differential pressure in certain portions of the bearing cavity for operation according to the invention. Manifold conduit section 16 connects the gas supply to circumferential openings 18 and 20 which are located on a latitude circle in the bearing cavity. Conventional pressure adjustment means 22 fixes the pressure in the manifold for subsequent regulation of gas flow out the circumferential openings. Flow control elements 24 and 26 in distribution lines 28 and 30 leading to said circumferential openings provides the bearing film regulation. The regulation itself is achieved by restricting flow in each distribution line adjacent the opening with an orifice hole, capillary, or the like. The circumferential openings are equispaced from each other on a latitude circle in the bearing cavity and are of approximately equal size. Each of these openings directs the regulated gas flow inwardly in a radial direction passing through the bearing axis. As shown in FIGURE 1, passageways 32 which terminate in the individual orifices are aligned at some convenient angle with the horizontal plane in order to direct gas flow against rotor surface 34. The emerging gas flows are directed by contact with said rotor surface into the annular clearance space 36 on both sides of the orifice openings to provide the uniform bearing film. A second supply line 38 leads from gas source 14 to plenum chamber 40 in the bearing cavity. Pressure adjustment means 42, which can be a regulator valve, or the like is placed in the supply line to maintain a lower gas pressure in the plenum chamber than at the circumferential openings. Said plenum chamber is a centrally located pocket in the base of the hemispherical cavity which is separated from the orifice openings by an intervening portion of the bearing surface. The area defined by the pocket is sufficient for communication with the rotor passageway over a substantial roll angle from the bearing axis. The regular contour of the pocket as defined by surface 44 maintains uniform gas flow to the rotor during such displacement. There should be enough volume in the pocket to avoid biasing torques on the rotor from high velocity gas flow to the rotor passageway. The upper end of the rotor passageway is aligned with opening 46 in table member 2. Said opening provides suitable communication to the exterior components (not shown) being furnished with the gas stream.

Operation of the bearing may be commenced with gas flow to the circumferential openings and bearing pocket. A pressure differential is advantageously established in the cavity with a higher pressure at the openings than in the pocket. Gas flow proceeds from the higher pressure regions adjacent the circumferential openings to the pocket and upper edges of the bearing cavity. After establishing this pressure gradient, the pocket pressure may be raised while maintaining the differential until the bearing load is lifted. The resultant bearing film is relatively stable even under localized changes in the pocket pressure. By contrast, there is dynamic instability in a conventional spherical bearing having only a pocket at the base of the cavity. There need be only variation of the pressure at the circumferential openings in the present bearing to compensate for small load variations.

Minimum error torque in bearing operation is afforded by modification of the circumferential gas feed means as disclosed in the previously mentioned copending patent application. More particularly, a gas-feed groove located on the latitude circle in the spherically shaped bearing surface with flow control orifices at the base of the groove correct any directional difference in the gas flow pattern between individual orifices. The desired cooperation as therein described is achieved with a shallow trough of uniform cross section opening which may extend completely around the latitude circle. Alternately, the groove element may be divided into segments of equal length being equispaced from one another with each segment having supply orifices at its midpoint. A still different method of providing lift action for the rotor employs a series of laterally disposed pockets in the bearing cavity separated from each other with intervening portions of the bearing surface. In its broadest sense, therefore, the present invention contemplates using any openings disposed uniformly around the bearing cavity to direct gas flow through the bearing in cooperation with the plenum chamber and perforated rotor components.

In FIGURE 2, there is shown a schematic block diagram of gas flow through a different bearing assembly of the invention. Flow diagram 50 shows the paths from a single pressurized gas supply 52 to the plenum chamber and circumferential openings in the bearing cavity. Supply stream 54 provides gas to a reservoir chamber 56 connected to the circumferential openings in the bearing cavity. Valve 58 adjusts the gas pressure in said reservoir chamber. The capacity of said chamber is sufficient for a continued gas flow over short time intervals when supply source 52 might be interrupted. Manifold line 60 leads from the reservoir chamber to three distribution passageways 62, 64, and 66 in the bearing support member. Each of said passageways terminates in the hemispherical cavity to collectively provide the bearing function. Conventional flow control elements 68, 70 and 72 are located in the distribution passageways adjacent the circumferential openings for adjustment of the bearing film thickness. Part of the gas being admitted in this manner to bearing cavity 74 exhausts to the atmosphere at upper edge 76. The remaining gas flow 78 passes into plenum chamber 80 by reason of the existing pressure differential.

Gas flow 82 from the plenum chamber is transported to reaction jet element 84. Supply line 86 to the plenum chamber in the bearing cavity connects the principal gas source to reservoir chamber 88. Pressure adjustment means 90 in said supply line regulates the gas pressure in this chamber which in turn controls the supply pressure in plenum chamber 80. Distribution line 92 feeds the gas from the reservoir to the bearing cavity. A relief vent 94 in said distribution line to the atmosphere prevents pressure buildup in the plenum chamber from bearing cavity flow when the reaction jets are shut off. Valve 96 controls this gas leak from the plenum chamber and may be operated in cooperation with the control means for the reaction jets.

From the foregoing description it will be apparent that a generally improved gas bearing construction has been provided. It is not intended to limit the present invention to the preferred embodiments above shown, however, since certain modifications of the present teachings can be made without departing from the true spirit and scope of the invention. For example, the precise operation of the present bearing construction makes it ideally suited for use in critical applications such as inertial guidance systems, space simulation devices, and the like. Optimum utilization in these applications may dictate recirculation of the gas being supplied to the bearing. This can be achieved readily with collection means leading from the bearing cavity and pump means for returning the collected gas to the supply source. Likewise, it may prove advantageous to employ more than a single external gas supply for the separate functions being carried out in present bearing construction. It is intended to limit the present invention, therefore, only to the scope of the following claims.

What I claim as new and desire to be secured by Letters Patent of the United States is:

1. An externally pressurized gas bearing having a table member supported by a spherically shaped rotor, said rotor having a longitudinal passageway extending along a vertical bearing axis, a spherically shaped bearing surface supporting said rotor for motion of said table member about three axes, said bearing axis and the spherically shaped bearing surface being aligned in the vertical direction, a plenum chamber in the base of said spherically shaped bearing surface in communication with the rotor passageway, circumferential openings disposed uniformly around the latitude circle in said bearing surface, and gas supply means for circumferential openings and the plenum chamber.

2. An externally pressurized gas bearing having a table member supported by a spherically shaped rotor, said rotor having a longitudinal passageway extending along a vertical bearing axis, a spherically shaped bearing surface supporting said rotor for motion of said table member about three axes, said bearing axis and the spherically shaped bearing surface being aligned in the vertical direction, a plenum chamber in the base of said spherically shaped bearing surface in communication with the rotor passageway, said plenum chamber enveloping enough of the rotor surface for continued communication with the rotor passageway when the latter element is displaced by significant angle from the bearing axis, circumferential openings disposed uniformly around the latitude circle in said bearing surface, and gas supply means for the circumferential openings and plenum chamber.

3. An externally pressurized gas bearing having a table member supported by a spherically shaped rotor, said rotor having a longitudinal passageway extending along a vertical bearing axis, a spherically shaped bearing surface supporting said rotor for motion of said table member about three axes, said bearing axis and the spherically shaped bearing surface being aligned in the vertical direction, a plenum chamber at the base of said spherically shaped bearing surface in communication with the rotor passageway, a gas-feed groove located on a latitude circle in said bearing surface, openings at the base of said groove being equispaced from one another, and gas supply means providing for the groove openings and the plenum chamber.

4. An externally pressurized gas bearing having a table member supported by a spherically shaped rotor, said rotor having a longitudinal passageway extending along a vertical bearing axis, a spherically shaped bearing surface supporting said rotor for motion of said table member about three axes, said bearing axis and the spherically shaped bearing surface being aligned in the vertical direction, a plenum chamber in the base of said spherically shaped bearing surface in communication with the rotor passageway, a segmented gas-feed groove located on a latitude circle in said bearing surface, all groove segments being of equal length and equispaced from one another, openings at the base of said groove segments, said openings being located at the mid points of each groove segment, and gas supply means for the groove openings and plenum chamber.

5. An externally pressurized gas bearing having a table member supported by a spherically shaped rotor, said rotor having a longitudinal passageway extending along a vertical bearing axis, a spherically shaped bearing surface supporting said rotor for motion of said table member about three axes, said bearing axis and the spherically shaped bearing surface being aligned in the vertical direction, a plenum chamber in the base of said spherically shaped bearing surface in communication with the rotor passageway, circumferential openings disposed uniformly around a latitude circle in said bearing surface, gas supply means for the circumferential openings and plenum chamber, and pressure adjustment means for the gas supply to the plenum chamber.

6. An externally pressurized gas bearing having a table member supported by a spherically shaped rotor, said rotor having a longitudinal passageway extending along a vertical bearing axis, a spherically shaped bearing surface supporting said rotor for motion of said table member about three axes, said bearing axis and the spherically shaped bearing surface being aligned in the vertical direction, a plenum chamber in the base of said spherically shaped bearing surface in communication with the rotor passageway, circumferential openings disposed uniformly around a latitude circle in said bearing surface, gas supply means for the circumferential openings and plenum chamber, and pressure adjustment means for the gas being supplied to the circumferential openings as well as to the plenum chamber.

7. An externally pressurized gas bearing having a table member supported by a spherically shaped rotor, said rotor having a longitudinal passageway extending along a vertical bearing axis, a spherically shaped bearing surface supporting said rotor for motion of said table member about three axes, said bearing axis and the spherically shaped bearing surface being aligned in the vertical direction, a plenum chamber in the base of said spherically shaped bearing surface in communication with the rotor passageway, circumferential openings disposed uniformly around a latitude circle in said bearing surface, gas supply means providing gas for the circumferential openings and the plenum chamber, and exhaust means for the gas being supplied to the plenum chamber.

8. An externally pressurized gas bearing having a table member supported by a spherically shaped rotor, said rotor having a longitudinal passageway extending along a vertical bearing axis, a spherically shaped bearing surface supporting said rotor for motion of said table member about three axes, said bearing axis and the spherically shaped bearing surface being aligned in the vertical direction, a plenum chamber in the base of said spherically shaped bearing surface in communication with the rotor passageway, circumferential openings disposed uniformly around the latitude circle in said bearing surface, means for regulating gas flow from positions adjacent to the circumferential openings, and gas supply means for the circumferential openings and plenum chamber.

9. An externally pressurized gas bearing having a table member supported by a spherically shaped rotor, said rotor having a longitudinal passageway extending along a vertical bearing axis, a spherically shaped bearing surface supporting said rotor for motion of said table member about three axes, said bearing axis and the spherically shaped bearing surface being aligned in the vertical direction, a plenum chamber in the base of said spherically shaped bearing surface in communication with the rotor passageway, said plenum chamber enveloping enough of the rotor surface for continued communication with the rotor passageway when the latter element is displaced by significant angle from the bearing axis, a gas-feed groove located on the latitude circle in said bearing surface, openings at the base of said groove being equispaced from one another, means for regulating gas flow from positions adjacent to the groove openings, gas supply means for the groove openings and plenum chamber, pressure adjustment means for the gas being supplied to the groove openings as well as to the plenum chamber, and exhaust means for the gas being supplied to the plenum chamber.

References Cited

UNITED STATES PATENTS

| 2,086,896 | 7/1937 | Carter | 308—122 |
| 2,711,352 | 6/1955 | Hasko et al. | 308—72 |
| 2,998,999 | 9/1961 | Morser et al. | 308—122 |
| 3,005,666 | 10/1961 | Morser et al. | 308—122 |

MARTIN P. SCHWADRON, *Primary Examiner.*

FRANK SUSKO, *Examiner.*